(12) United States Patent
Steffenfauseweh et al.

(10) Patent No.: US 8,337,132 B2
(45) Date of Patent: Dec. 25, 2012

(54) ADJUSTMENT ELEMENT

(75) Inventors: Sandra Steffenfauseweh, Verl (DE);
Alexander Vorderwisch, Bielefeld (DE); Gerald Welzel, Bielefeld (DE)

(73) Assignee: Bollhoff Verbindungstechnik GmbH (DE)

( * ) Notice: Subject to any disclaimer, the term of this patent is extended or adjusted under 35 U.S.C. 154(b) by 288 days.

(21) Appl. No.: 12/734,916

(22) PCT Filed: Oct. 17, 2008

(86) PCT No.: PCT/EP2008/008811
§ 371 (c)(1), (2), (4) Date: Jun. 29, 2010

(87) PCT Pub. No.: WO2009/071151
PCT Pub. Date: Jun. 11, 2009

(65) Prior Publication Data
US 2010/0278612 A1    Nov. 4, 2010

(30) Foreign Application Priority Data

Dec. 5, 2007   (DE) .................. 20 2007 016 945 U

(51) Int. Cl.
*F16B 43/00*    (2006.01)
(52) U.S. Cl. ...... 411/539; 411/535; 411/546; 403/408.1
(58) Field of Classification Search ............ 411/398, 411/383, 384, 535, 539, 546; 403/408.1; 362/459, 549, 289; 606/300, 320, 268
See application file for complete search history.

(56) References Cited

U.S. PATENT DOCUMENTS

| | | | | |
|---|---|---|---|---|
| 5,443,526 A | * | 8/1995 | Hoerner ..................... | 623/38 |
| 6,131,346 A | * | 10/2000 | Kordes ..................... | 52/235 |
| 6,158,177 A | * | 12/2000 | Blobaum ................... | 52/208 |
| 6,623,203 B2 | * | 9/2003 | Kreyenborg et al. ...... | 403/374.3 |
| 6,860,686 B2 | * | 3/2005 | Schneider ................. | 411/34 |
| 7,037,027 B2 | * | 5/2006 | Steinbeck ................. | 403/408.1 |
| 7,168,835 B2 | * | 1/2007 | Steinbeck et al. ......... | 362/523 |
| 7,338,192 B2 | * | 3/2008 | Kreutzberg .............. | 362/523 |

FOREIGN PATENT DOCUMENTS

| | | |
|---|---|---|
| DE | 295 09 925 U1 | 6/1995 |
| DE | 195 46 703 C1 | 12/1995 |

(Continued)

OTHER PUBLICATIONS

Int'l Search Report, Feb. 3, 2009.

*Primary Examiner* — Flemming Saether
(74) *Attorney, Agent, or Firm* — Seyfarth Shaw LLP

(57) ABSTRACT

The present invention provides an adjustment element 1 with which a component can be fastened and can be positioned in space. The adjustment element has the following features: a banjo bolt 10 with an external thread 12 with which the component holder 50 can be positioned in the axial direction of the banjo bolt 10, an inner element 20 which is arranged within the banjo bolt 10 and to which the banjo bolt 10 is rotatably fastened, and a washer 30 which is held between the banjo bolt 10 and inner element 20 in a manner such that it can be laterally displaced in the axial direction of the inner element 20 such that the adjustment element 1 can be laterally positioned and can be fixed with a fastening means 40 reaching through the washer 30.

8 Claims, 5 Drawing Sheets

FOREIGN PATENT DOCUMENTS

Figure 1:
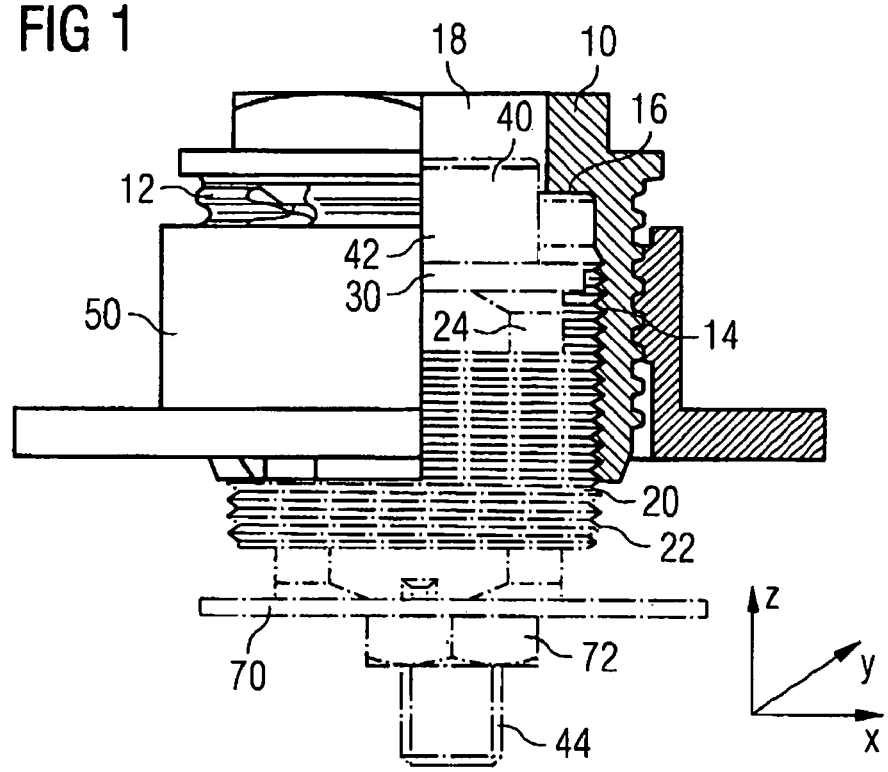

| | | |
|---|---|---|
| DE | 199 49 654 A1 | 10/1999 |
| DE | 100 63 649 A1 | 12/2000 |
| DE | 10 2005 044 064 A1 | 9/2005 |
| DE | 196 50 864 B4 | 10/2006 |
| DE | 10 2007 002699 A1 | 1/2007 |
| EP | 0 679 553 A | 4/1995 |
| EP | 1 217 222 A | 6/2002 |
| EP | 1 464 539 A | 10/2004 |
| EP | 15 91 675 A2 | 11/2005 |
| EP | 17 15 198 A2 | 10/2006 |

\* cited by examiner

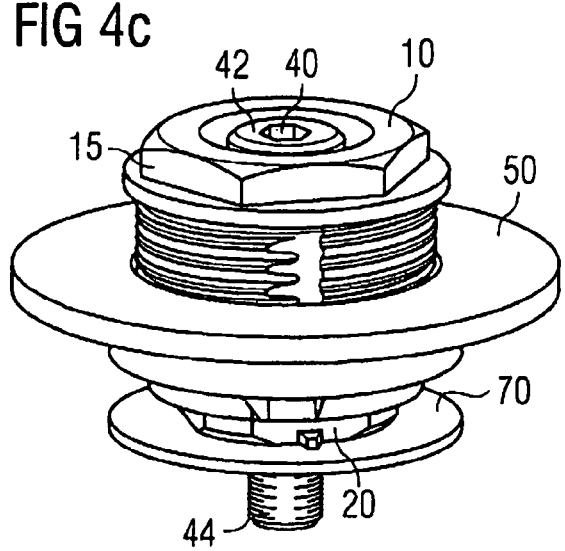
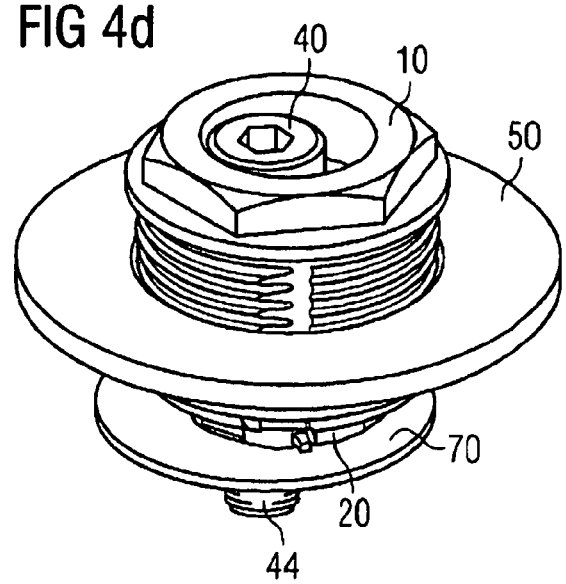
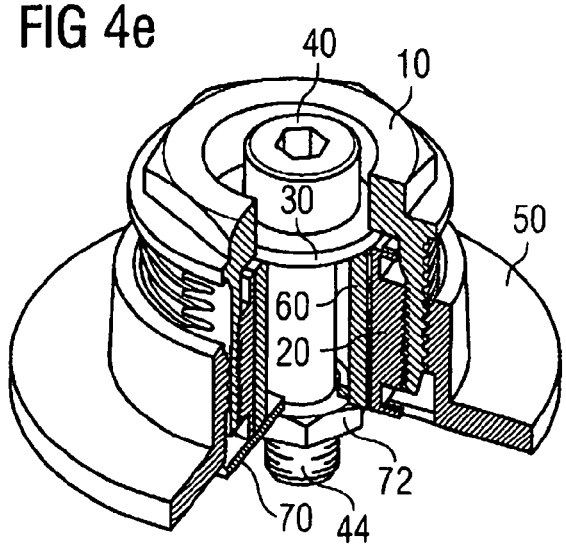

ADJUSTMENT ELEMENT

This application is a U.S. National Phase of International Patent Application Serial No. PCT/EP2008/008811, filed Oct. 17, 2008 which claims priority to German Patent Application No. 20 2007 016 945.0 filed Dec. 5, 2007.

FIELD OF THE INVENTION

The present invention relates to an adjustment element with which a component can be fastened and can be positioned in space, i.e., its position in the x, y, and z direction can be selected and fixed.

BACKGROUND OF THE INVENTION

In the state of the art, such adjustment elements are used, for example for fastening headlights in motor vehicle manufacturing. During the installation of the headlights, a fastening and a targeted positioning of the headlight is necessary. To implement this, known adjustment elements consist of a hollow bolt, a fastening bolt with washer and a blind rivet nut, which is fastened in an auto body sheet.

The hollow bolt of the adjustment element is screwed into a fastening eye of the headlight corresponding to the desired position in the z direction. Because the hollow bolt is supported on the auto body sheet, it defines the distance between the fastening eye and the auto body sheet, therefore, the z position of the headlight. The fastening bolt grasps through the hollow bolt and is screwed into the blind rivet nut. The diameter of the fastening bolt is less than the through opening of the hollow bolt. As a result, the hollow bolt, and therefore the headlight can be positioned in the xy plane, because the hollow bolt remains laterally movable despite the fastening bolt. As soon as the xy position is adjusted, the fastening bolt is tightened. For this, during tightening a flat washer is pressed onto the surface of the hollow bolt, so that the hollow bolt is held between the auto body sheet and the flat washer. To attain a reliable countering of the hollow bolt using the flat washer, the flat washer completely covers the top side of the hollow bolt. Therefore, on the one hand, the hollow bolt is no longer accessible for further adjustment, and additionally movement of the hollow bolt is prevented by fastening the fastening bolt.

It is therefore disadvantageous with this design that for readjustments of the z position and respectively the hollow bolt, the fastening bolt must always be loosened. During the loosening of the fastening bolt, the fixed xy position is lost simultaneously. After the z position has been readjusted, likewise a readjustment of the xy position must occur. High costs are connected with this high installation and maintenance effort.

Therefore, it is the object of the present invention to provide an adjustment element with which, in comparison to the state of the art, a component can be fastened with less effort and can be positioned in space.

SUMMARY OF THE INVENTION

The adjustment element according to the invention, with which a component can be fastened and can be positioned in space, has the following features: a hollow bolt having an outer thread, with which a holder of the component can be positioned in the axial direction of the hollow bolt, an inner element, which is disposed within the hollow bolt and to which the hollow bolt is fastened in a rotatable manner, and a washer, which is held laterally movable in the axial direction of the inner element between the hollow bolt and the inner element, so that the adjustment element can be positioned laterally and can be fixed with a fastening means grasping through the washer.

Using the embodiment of the adjustment element according to the invention an independent positioning of a fastened component is possible in the z direction and in the xy plane. The z position is adjusted by rotating the hollow bolt, whereby the holder of the component can be positioned in the z direction in a targeted manner using the outer thread of the hollow bolt and/or using the thread pairing of the hollow bolt and inner element. The z positioning can also occur when the component is fastened in its xy position. The xy position is fixed using a fastening means and the inner element of the adjustment element. The present design simultaneously makes it possible that the xy position of the component can be modified with a z position that is not to be changed. For this purpose, the fastening means, which fixes the inner element, is loosened. Then, the hollow bolt can be moved laterally relative to the fastening means, without change to the adjusted z position. After the new xy position has been adjusted, a renewed fixing of the inner element and therefore also of the hollow bolt occurs using the fastening means.

According to one embodiment, the inner element is fastened within the hollow bolt using a latching. Such a latching guarantees a fastening of the hollow bolt to the inner element that is without play, while at the same time, the hollow bolt can be rotated about its longitudinal axis. Thereby, adjusting a z position—that is, in the longitudinal direction of the hollow bolt—is guaranteed in that the holder of the component to be fastened is screwed onto the outer threads of the hollow bolt up to the desired position.

According to a further embodiment of the adjustment element its hollow bolt has an inner thread running counter to or in the same direction as the outer thread, while its inner element is designed as a threaded bushing and its radial outer side comprises a thread, with which the threaded bushing can be offset within the hollow bolt.

In this preferred embodiment, the hollow bolt and the inner element are fastened together in a rotatable manner using a thread. If the z position of the holder of the component is adjusted by rotating the hollow bolt, the adjustment travel in the z direction results from a movement of the holder on the outer thread of the hollow bolt and an offset of the hollow bolt on the outer thread of the inner element. In this manner by adapting the threads, running in the same direction or opposite directions, on the inner and outer side of the hollow bolt, the number of rotations of the hollow bolt necessary to attain a specific adjustment travel in the z direction, can be adjusted.

In a further embodiment of the adjustment element according to the invention, its hollow bolt has a drive element and/or a collar extending inwardly, which tapers a through opening of the hollow bolt such that it is narrower than an outer diameter of the washer.

The washer is held between the hollow bolt and the inner element using design alternatives described above. If, in addition, the washer is fastened to the fastening means in a captive manner, the adjustment element can be provided as a cohesive unit of hollow bolt, inner element, washer and fastening means. According to a further embodiment, the inner element has an axial projection so that the washer is held between the collar of the hollow bolt and this projection.

According to a further alternative of the adjustment element, the outer diameter of the washer is smaller than a diameter of the through opening of the hollow bolt, and/or a diameter of a through opening of the inner element is larger than a diameter of the fastening means so that, using the differences in the diameters, a maximum lateral positioning travel of the adjustment element can be established.

Because the fastening means, for example a fastening bolt, is fixed in its xy position, the difference between the diameter of the fastening means and the inner diameter of the inner element determines the maximum lateral positionability or adjustability of the inner element or of the adjustment element around the position of the fastening means. Furthermore, it can be applicable that the maximum lateral positioning travel of the adjustment element is determined by the difference between the diameter of the through opening of the hollow bolt and the outer diameter of the washer. As soon as the outside of the washer contacts the inner wall of the hollow bolt during positioning in the xy plane, the maximum lateral positioning travel of the adjustment element has been exhausted. This way, it is possible to determine the maximum lateral positioning travel of the adjustment element by targeted dimensioning of the diameter of the fastening means, of the inner diameter of the inner element, the outer diameter of the washer, and the inner diameter of the hollow bolt.

As design alternatives of the fastening means, it is preferred to equip the fastening means with a head and a thread, or a rotation lock, or a bayonet lock, or a snap lock.

BRIEF DESCRIPTION OF THE ACCOMPANYING DRAWINGS

Figure 2:
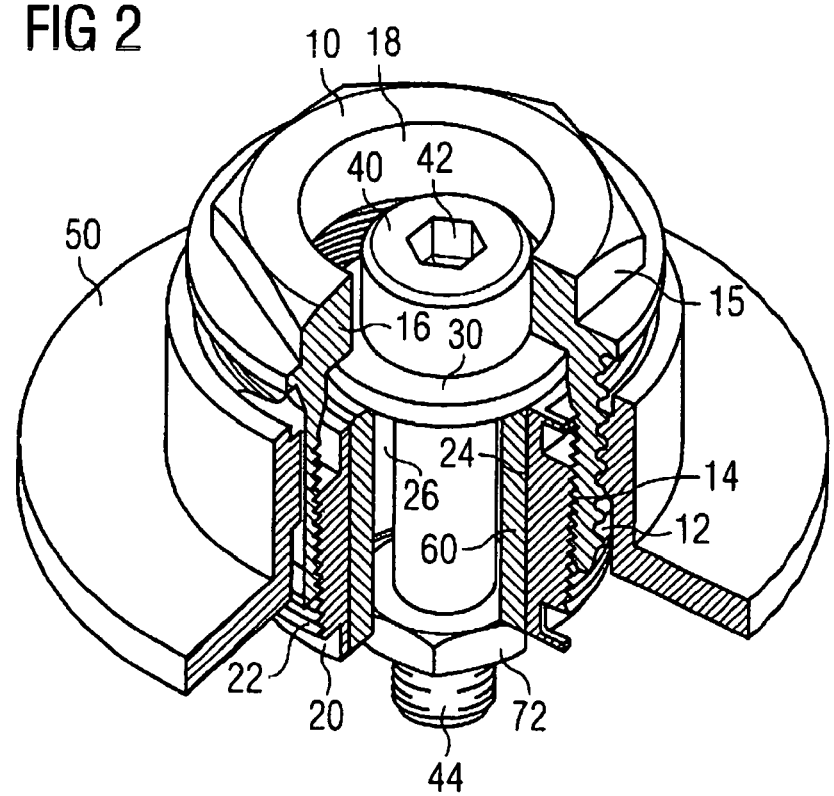
Figure 5:
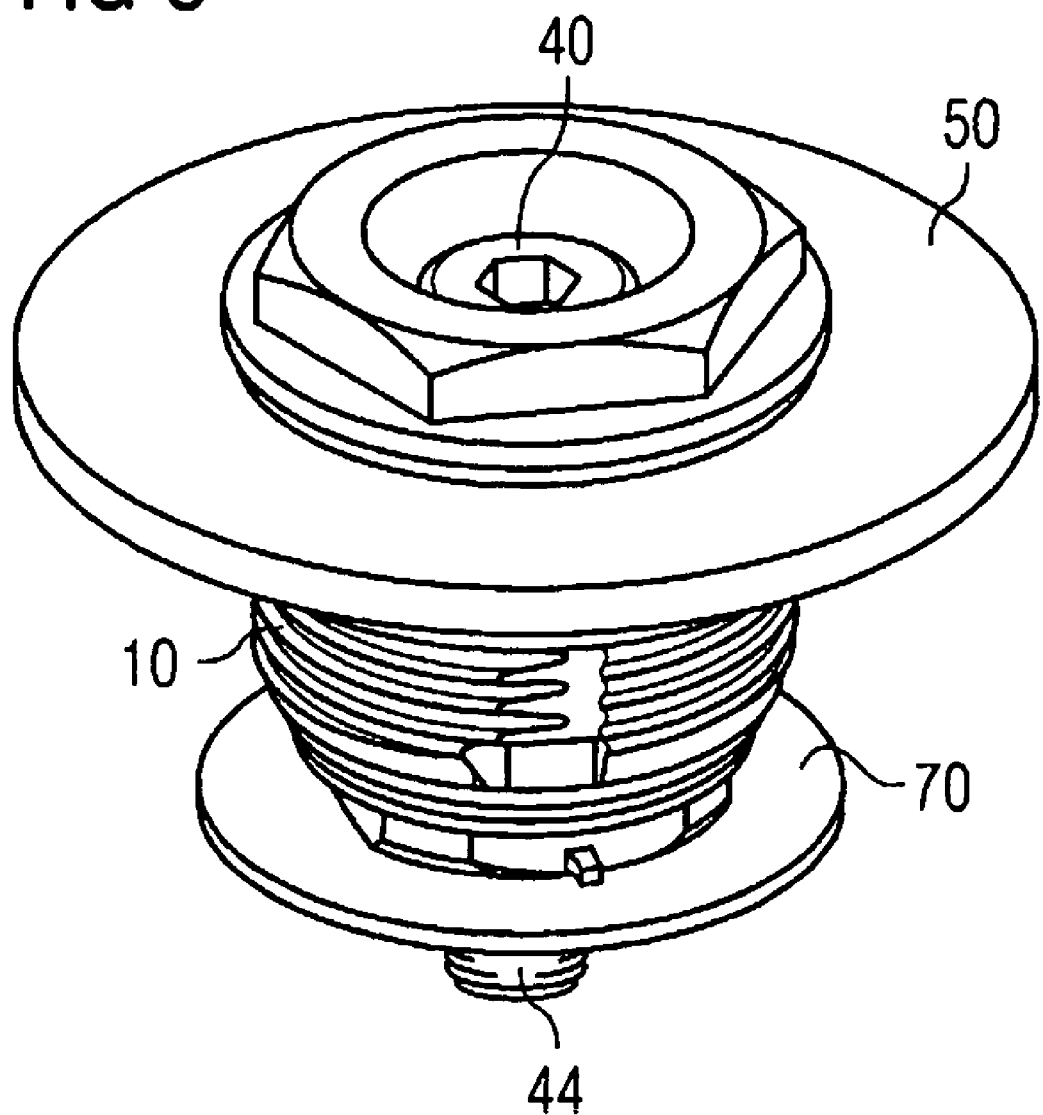

Preferred embodiments of the present invention are explained in more detail in reference to the accompanying drawings. They show:

FIG. 1 a partial, lateral sectional view of a preferred embodiment of the adjustment element according to the invention, FIG. 2 a perspective sectional view of a preferred embodiment of the adjustment element according to the invention, FIG. 3a to d individual stations of the assembly of a part of the adjustment element, FIG. 4a to e an exemplary installation, fixing and adjusting sequence of a preferred embodiment of the adjustment element according to the invention, and FIG. 5 a further exemplary representation of the installed adjustment element.

DETAILED DESCRIPTION OF PREFERRED EMBODIMENTS

FIG. 1 shows a preferred embodiment of the adjustment element 1 according to the invention in a lateral partial sectional view. The adjustment element 1 comprises a hollow bolt 10, and inner element 20 and a washer 30. It is used for fixing and positioning any arbitrary component, for example a headlight in vehicle manufacturing, in space, that is, in the x, y and z direction. The headlight must be fastened during its installation in the auto body 70 of the vehicle. For this, the headlight must be positioned such that the requirements on the gap dimensions between the headlight and the auto body parts are fulfilled, especially on the outside of the vehicle. This requires a targeted positioning and fastening in all three spatial directions.

The component to be fastened and positioned, exemplified here by the headlight, comprises a holder 50. The holder 50 is fastened to the adjustment element 1, and adjusted in the z direction using an outer thread 12 of the hollow bolt 10. An adjustment in the z direction occurs parallel to the longitudinal axis of the hollow bolt 10, as is indicated in FIG. 1 by the directional arrows. By rotating the hollow bolt 10, the holder 50 is therefore screwed onto the hollow bolt 10 to the desired z position. For this purpose, the outer thread 12 is formed as a standard thread, a fine pitch thread or a self tapping thread. According to a further preferred embodiment, the outer thread 12 is a self-locking thread as is described, for example, in EP 1 715 198 or EP 1 591 675.

The holder 50 is preferably provided as a receiving dome made of plastic. Naturally, other materials are also conceivable for the holder 50 for example metals, which satisfy the necessary stability and weight requirements.

The adjustment element 1 is fastened using a fastening means 40 to a fixed point, for example the body 70 of a vehicle. For this purpose, the fastening means 40 interacts with an appropriate partner 72. According to a first alternative, the fastening means 40 is a fastening bolt with bolt head 42, drive feature, for example slot, hexagon or socket key receiver, and thread 44. The fastening bolt 40 is screwed into a blind rivet nut or a weld nut 72, which is fastened to the auto body sheet 70. According to a further alternative of the fastening means 40, it comprises a rotation lock, or a bayonet lock, or a snap lock on its end axially opposite the head 42. These interact with appropriate shapes of the partner 72, for example in the auto body sheet 70, so that a reliable fixing of the adjustment element 1 to the auto body 70 can be implemented using the fastening means 40.

If the fastening means 40 is fastened, for example to the auto body sheet 70, the adjustment element 1 is clamped to the auto body sheet 70 using the washer 30 and the inner element 20. Because the hollow bolt 10 is fastened to the inner element 20 in a rotational manner, in this way, the holder 50 located on the hollow bolt 10 is also fixed in its xy position.

According to one embodiment of the adjustment element 1, the hollow bolt 10 is fastened in a rotational manner to the outer side of the inner element 20. During rotation of the hollow bolt 10, the hollow bolt 10 is not displaced in the axial direction relative to the inner element 20. This is implemented, for example by a snap connection, without play, between the inner element 20 and the hollow bolt 10, so that the adjustment element 1 is simple to manufacture, and can be moved (not shown).

According to a further alternative, the inner element 20 has a thread 22 on its radial outer side that is formed matched to the inner thread 40 of the hollow bolt 10. The inner element 20 is therefore implemented as a threaded bushing. The outer thread 12 and the inner thread 14 of the hollow bolt 10 are formed in the opposite direction. This has the advantage that during rotation of the hollow bolt 10, and with it, the positioning of the holder 50/component in the z direction, a combined adjustment travel results for the holder 50/component. The combined adjustment travel of the holder 50 is composed of the offset in the z direction, by rotation of the hollow bolt 10 on the thread 22 of the inner element 20, and by the holder 50 being simultaneously screwed onto the outer thread 12 of the hollow bolt 10 during its rotation. In the same manner, it is also preferable to form the outer thread 12 in the inner thread 14 of the hollow bolt 10 in the same direction. Therefore, by suitable dimensioning of the pitch of the inner 14 and outer threads 12 of the hollow bolt 10; it is possible to determine a desired number of rotations of the hollow bolt 10 for the z positioning of the holder 50. This eases the installation of the adjustment element, and the component to be positioned with it, and reduces a possible maintenance effort. The above-mentioned features of the adjustment element 1 can be seen also in FIG. 2. According to a further design, the inner element 20 has a sleeve 60. The sleeve 60 is preferably composed of metal or another stabilizing material for reducing the seating stress of a plastic variant of the inner element 20. Therefore, materials with appropriate high strength values, i.e., tensile strength and compressive resistance, are preferred. This guarantees a standardized screwed connection with higher fastening torques, therefore, a reliable fastening of the inner element 20 without the deformation thereof. Therefore the sleeve 60 inserted into the inner element 20 acts as a reinforcement or compression limiter, because it minimizes, preferably prevents, a relaxation of the inner element 20. With a plastic variant of the inner element 20, there exists the possibility that, due to the mechanical loading by the hollow bolt 10, it yields or flows, such that the positioning as well as the fastening is disrupted by the adjustment element 1. In a further design of the present invention it is also preferable to produce inner element 20 completely from metal so that due to its material, the inner element 20 does not require an additional stabilizing sleeve 60.

As can be seen in FIG. 2, according to a further design of the adjustment element 1, a diameter of a through opening 26 of the inner element 20, with or without sleeve 60, is formed larger than a diameter of the fastening means 40. When the fastening bolt 40 is already screwed partially into the weld nut 72, whereby the adjustment element 1 is not yet fixed in its xy position (see FIG. 1), it is still possible to move the adjustment element 1 laterally relative to the longitudinal axis of the fastening means 40. The sideward or lateral movement, or the maximum lateral positioning travel, of the adjustment element 1 in the xy plane (see FIG. 1) is determined by the difference between the diameter of the through opening 26 of the inner element 20, or of the sleeve 60, and the diameter of the fastening means 40. If this lateral positioning travel is utilized, the head 42 of the fastening means 40, after fixing the adjustment element 1, is disposed in the desired xy position, for example off-center, relative to the hollow bolt 10. This is represented in FIG. 4d.

Alternatively or in combination, the lateral positioning travel in the xy plane is determined by the difference between a diameter of the through opening 18 of the hollow bolt 10 and an outer diameter of the washer 30, i. e., the distance between the inner wall 19 of the hollow bolt 10 and the outer edge of the washer 30. The washer 30 serves to fix the inner element 20 to the auto body sheet 70 using the fastening means 40. For this, the washer 30 presses at least on a part of the axial face side of the inner element 20 facing towards it, and thereby fixedly clamps the inner element 20 between the washer 30 and the auto body sheet 70. The washer 30 is disposed on the fastening means 40, preferably fastened to it in a captive manner. The inner element 20, and with it the adjustment element 1, is offset or positioned in the xy plane around the fastening means 40 before being fixed. The maximum lateral positioning travel is reached as soon as the outer radial edge of the washer 30 contacts the inner wall of the hollow bolt 10. Based on the designs described above, preferably a maximum lateral positioning travel of ±2.5 mm, in combination with a maximum adjustment travel of approximately 8 mm in the z direction using the adjustment element 1, is implemented. In a further design of the invention, these positioning travels can be modified in their dimensions to applications.

According to a further embodiment of the adjustment element 1, the hollow bolt 10 comprises a radial collar 16 extending inward in its through opening 18. The collar 16 narrows the through opening 18 of the hollow bolt 10 in such a way that the washer 30 is held in a captive manner between the collar 16 and inner element 20. If the washer 30, in addition, is connected to the fastening means 40 in a captive manner, the adjustment element 1 can be provided as a cohesive pre-assembled component. This reduces the installation expenditure of the adjustment element 1 because no assembly of individual components of the adjustment element 1 is necessary during the manufacture, for example of a vehicle.

Optionally, the inner element 20 comprises an axial projection 24 on one or both axial face sides. Thereby, the washer 30 is held between the collar 16 and the projection 24. Using the second optional collar, the inner element 20 is supported on the auto body sheet 70.

Figure 3A:
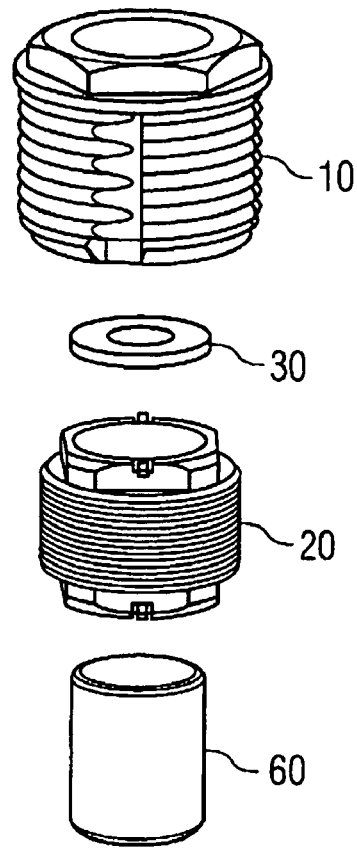
Figure 3B:
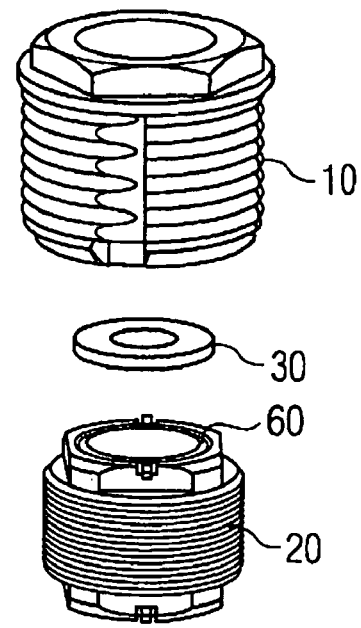
Figure 3C:
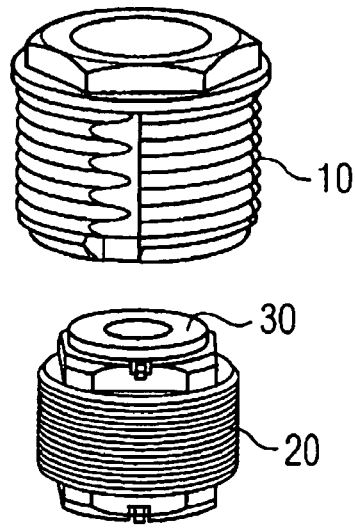
Figure 3D:
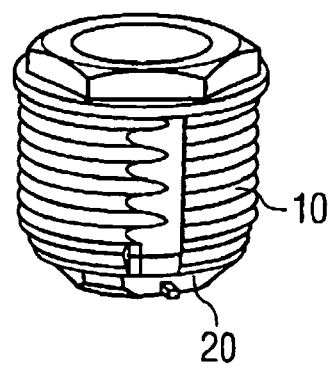
Figure 4A:
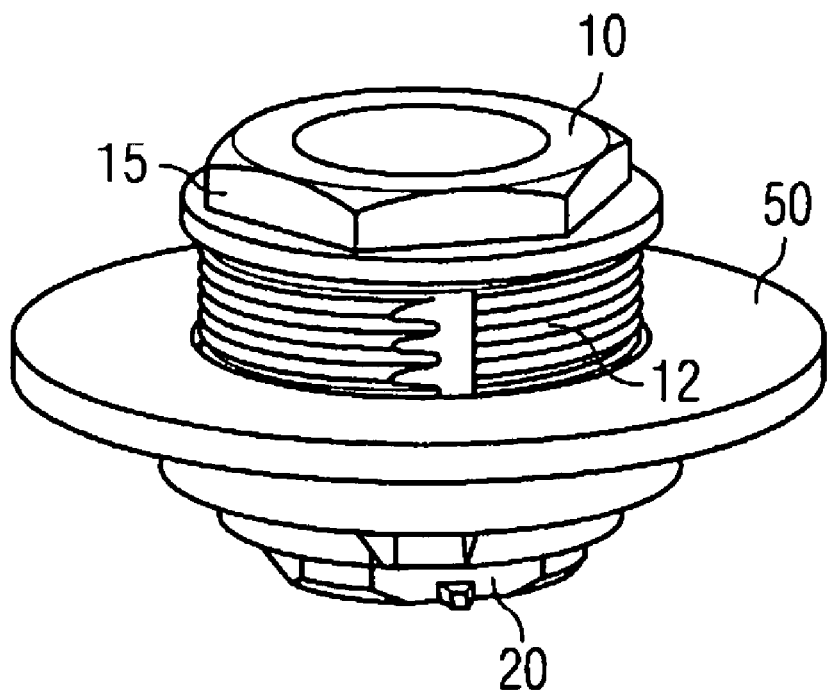
Figure 4B:
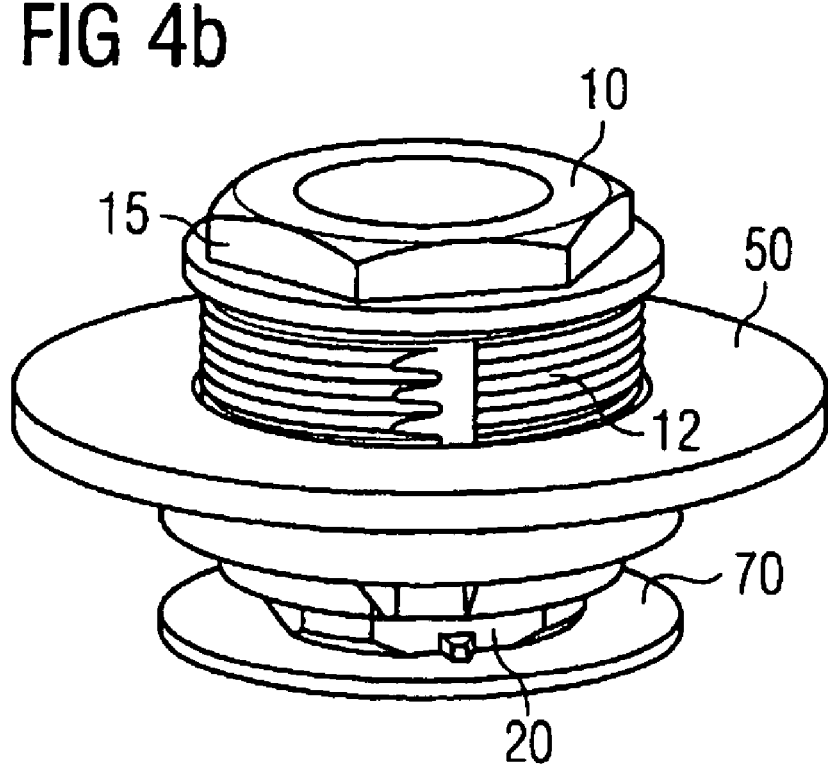

The assembly of the adjustment element 1 is explained in an exemplary manner using the FIGS. 3a to 3d. The individual components of the adjustment element are shown in FIG. 3a in an exploded representation. These include the hollow bolt 10, the washer 30, the threaded bushing 20 and the sleeve 60. Initially, according to FIG. 3b, the sleeve 60 is introduced into the threaded bushing 20, preferably press fit, inserted, or insert molded. Then, the washer 30 is placed on the threaded bushing 20 with pressed in sleeve 60 (see FIG. 3c). If the washer 30 is disposed on the fastening means 40 in a captive manner, the fastening means 40 would be disposed within the threaded bushing 20 in FIG. 3c. Then, the threaded bushing 20 with washer 30, and possibly fastening means 40, is screwed into the hollow bolt 10, as shown in FIG. 3d.

Preferably the adjustment element 1 is pre-assembled in the holder 50, for example of a headlight, for delivery to a vehicle manufacturer. This situation is represented as an example in FIG. 4a. For the installation of the headlight, the inner element 20 is initially placed on the location of the auto body sheet 70 that has a fastening possibility of the fastening means 40 (see FIG. 4b). Then, by insertion of the fastening means 40, a prefixing of the adjustment element 1 and the component fastened thereon is performed (see FIG. 4c). After the adjustment of the desired position of the component in the xy plane, the adjustment element 1 is fixed to the auto body sheet 70 using the fastening means 40. This leads for example, to an off-center position of the fastening means 40 with respect to the through opening 18 of the hollow bolt 10 (see FIG. 4d). This fixing in the xy position is displayed for supplementary illustration also in FIG. 4e as a perspective sectional view.

After the fixing in the desired xy position, the z position of the holder 50, and thus of the headlight, is adjusted by rotating the hollow bolt 10. This results in the arrangement shown as an example in FIG. 5.

Depending on the desired procedure, it is possible initially to perform the fixing of the adjustment element 1 in the desired xy position, and subsequently to adjust the z position. It is further conceivable, initially to adjust the xy position, however without fixing the adjustment element 1 to the auto body sheet 70 using the fastening means 40. Subsequently, the z position is adjusted. Finally, a fastening of the adjustment element 1 using the fastening means 40 occurs. The adjustment element 1 according to the invention also makes it possible to readjust the xy position without having to change the adjustment of the z position. Furthermore it is possible, to offset the z position without having to change or loosen the xy position. Based on this design, an optimal tolerance compensation, and with it a spatial disposition of a component is possible using the adjustment element 1 in combination with a reliable fastening.

REFERENCE LIST

1 Adjustment Element
10 Hollow bolt
12 Outer thread of the hollow bolt
14 Inner thread of the hollow bolt
15 Drive means of the hollow bolt
16 Collar of the hollow bolt 18 Through opening of the hollow bolt
19 Inner wall of the hollow bolt
20 Inner element, threaded bushing
22 Thread of the threaded bushing
24 Through opening of the inner element, contact surface of the inner element 20 for the sleeve 60
30 Washer
40 Fastening means
42 Head
44 Thread
50 Holder
60 Sleeve
61 Through opening of the sleeve
70 Auto body
72 Partner of the fastening means, for example weld nut; blind rivet nut, clip nut

The invention claimed is:

1. An adjustment element adapted to act upon a component and, comprising:
   a. a hollow bolt having an outer thread and an inner thread, wherein a holder of the component is adapted to be aligned in the axial direction of the hollow bolt,
   b. an inner element disposed axially displaceable within the hollow bolt, and coupled to the inner thread in a rotatable manner, and
   c. a washer adapted to be laterally displaceable and disposed between the hollow bolt and the inner element in the axial direction of the inner element, such that the adjustment element can be laterally disposed and can be coupled with a fastener extending through the washer.

2. The adjustment element according to claim 1, wherein the inner element is coupled within the hollow bolt by a snap connection between the inner element and the hollow bolt.

3. The adjustment element according to claim 1, wherein the hollow bolt includes an inner thread running counter to, or in the same direction as, the outer thread, and wherein the inner element is threaded bushing and includes a thread at a radial outside of the inner element, and wherein the threaded bushing is displaced with the inner element within the hollow bolt.

4. The adjustment element according to claim 1, wherein the hollow bolt includes a drive element and a collar projecting radially inward, the collar narrowing through opening of the hollow bolt such that the collar is smaller than an outer diameter of the washer.

5. The adjustment element according to claim 4, wherein the inner element includes an axial projection such that the washer is disposed between the collar and the projection.

6. The adjustment element according to claim 1, wherein the inner element includes a sleeve.

7. The adjustment element according to claim 1, wherein the outer diameter of the washer is smaller than a diameter of the through opening of the hollow bolt and/or a diameter of a through opening of the inner element is larger than a diameter of the fastener, such that a maximum lateral positioning travel of the adjustment element is determined by the difference in the diameters.

8. The adjustment element according to claim 1, wherein the fastener includes a head and a thread or a rotation lock or a bayonet lock or a snap lock.

\* \* \* \* \*